(12) United States Patent
Sager (10) Patent No.: US 10,967,598 B2
(45) Date of Patent: Apr. 6, 2021

(54) BOX AND METHOD OF CONSTRUCTING THE SAME

(71) Applicant: DOME ZERO INC, Lexington, MA (US)

(72) Inventor: Yildiray Sager, Lexington, MA (US)

(73) Assignee: Dome Zero Inc., Lexington, MA (US)

( * ) Notice: Subject to any disclaimer, the term of this patent is extended or adjusted under 35 U.S.C. 154(b) by 0 days.

(21) Appl. No.: 16/790,997

(22) Filed: Feb. 14, 2020

(65) Prior Publication Data

US 2020/0180254 A1 Jun. 11, 2020

Related U.S. Application Data

(63) Continuation of application No. 16/113,114, filed on Aug. 27, 2018, now Pat. No. 10,603,862.

(Continued)

(51) Int. Cl.
*B65D 3/20* (2006.01)
*B65D 5/355* (2006.01)
(Continued)

(52) U.S. Cl.
CPC .............. *B31B 50/28* (2017.08); *B31B 50/20* (2017.08); *B31B 50/622* (2017.08); *B31C 1/083* (2013.01);
(Continued)

(58) Field of Classification Search
CPC ....... B31B 50/28; B31B 50/20; B31B 50/622; B31C 1/083; B31C 11/04; B32B 29/005;
(Continued)

(56) References Cited

U.S. PATENT DOCUMENTS

| 726,894 A | * | 5/1903 | Ferres | ...................... F16L 9/16 |
| | | | | 138/144 |
| 1,502,864 A | | 7/1924 | Milligan | |

(Continued)

FOREIGN PATENT DOCUMENTS

| CN | 201120970 Y | 9/2008 |
| GB | 1331630 | 9/1973 |

(Continued)

OTHER PUBLICATIONS

Non Final Office Action for U.S. Appl. No. 16/113,114, dated Jun. 11, 2019, 7 pages.

(Continued)

*Primary Examiner* — Christopher R Demeree
(74) *Attorney, Agent, or Firm* — Daly, Crowley, Mofford & Durkee, LLP (57) ABSTRACT

A box suitable for the packaging of a consumer product is formed by helically wrapping an elongated continuous strip of material around a mandrel to form a main body with a plurality of bands. In one embodiment, adjacent bands partially overlie one another to form a multi-paneled main body with an open top end and an open bottom end. An adhesive is disposed within the region of contact between adjacent bands to retain the shape of the main body. First and second sets of slots are formed in the main body to create flaps dimensioned to selectively enclose the open top and bottom ends, respectively. To define the flaps and promote pivotal articulation, the main body is also preferably provided with score lines. By adjusting the configuration of the mandrel, a customized box can be constructed that is sized to receive a consumer product with limited wasted space.

7 Claims, 12 Drawing Sheets

Related U.S. Application Data (60) Provisional application No. 62/550,122, filed on Aug. 25, 2017, provisional application No. 62/550,301, filed on Aug. 25, 2017.

(51) Int. Cl.

| | | |
|---|---|---|
| *B65D 5/08* | (2006.01) | |
| *B31B 50/28* | (2017.01) | |
| *B31B 50/62* | (2017.01) | |
| *B31B 50/20* | (2017.01) | |
| *B31C 1/08* | (2006.01) | |
| *B31C 11/04* | (2006.01) | |
| *B32B 29/00* | (2006.01) | |
| *B32B 29/08* | (2006.01) | |
| *B31B 110/35* | (2017.01) | |
| *B31B 120/70* | (2017.01) | |

(52) U.S. Cl.
CPC ............ *B31C 11/04* (2013.01); *B32B 29/005* (2013.01); *B32B 29/08* (2013.01); *B65D 3/20* (2013.01); *B65D 5/0005* (2013.01); *B65D 5/08* (2013.01); *B31B 2110/35* (2017.08); *B31B 2120/70* (2017.08); *B32B 2439/62* (2013.01)

(58) Field of Classification Search
CPC ........ B32B 29/08; B65D 53/20; B65D 5/005; B65D 5/08; B65D 3/266
USPC ............. 229/101.1, 202; 156/195, 192, 184; 220/648; 493/299
See application file for complete search history.

(56) References Cited

U.S. PATENT DOCUMENTS

| | | | | |
|---|---|---|---|---|
| 1,975,428 | A * | 10/1934 | Robert | ................... B65D 59/04 |
| | | | | 206/430 |
| 2,179,504 | A | 11/1939 | Hasbrook | |
| 2,262,242 | A | 11/1941 | Lenox | |
| 2,315,217 | A | 3/1943 | Obiglio | |
| 3,137,437 | A | 6/1964 | Svensson | |
| 3,322,156 | A | 5/1967 | Stuart | |
| 3,380,147 | A | 4/1968 | McDonald | |
| 3,523,635 | A | 8/1970 | Croley et al. | |
| 4,349,110 | A | 9/1982 | Hayashi | |
| 4,872,590 | A | 10/1989 | Sasaki et al. | |
| 5,184,996 | A | 2/1993 | Rode et al. | |
| 5,286,246 | A | 2/1994 | Weder et al. | |
| 5,393,582 | A | 2/1995 | Wang et al. | |
| 5,484,100 | A * | 1/1996 | Rigby | .................... B65D 5/029 |
| | | | | 229/101.1 |
| 5,495,810 | A | 3/1996 | Yoshii | |
| 5,566,530 | A | 10/1996 | Johnstone et al. | |
| 6,939,424 | B1 | 9/2005 | Takala et al. | |
| 10,308,392 | B2 | 6/2019 | Ogawa et al. | |
| 2005/0236463 | A1 | 10/2005 | Boldrini et al. | |
| 2007/0235100 | A1 | 10/2007 | Tomerlin et al. | |
| 2008/0236765 | A1 | 10/2008 | Sager | |
| 2009/0320999 | A1 | 12/2009 | Sekar et al. | |
| 2010/0121312 | A1 | 5/2010 | Gielenz et al. | |
| 2011/0067775 | A1 | 3/2011 | Simonsohn | |
| 2015/0115022 | A1 | 4/2015 | Iwegbu | |
| 2015/0336325 | A1 | 11/2015 | Glasberg et al. | |
| 2016/0039551 | A1 | 2/2016 | Aganovic et al. | |
| 2016/0060014 | A1 | 3/2016 | Timmers et al. | |
| 2017/0112028 | A1 | 4/2017 | Millman et al. | |

FOREIGN PATENT DOCUMENTS

| | | |
|---|---|---|
| GB | 1 347 244 | 2/1974 |
| JP | S55 104621 U | 7/1980 |

OTHER PUBLICATIONS

Response to Office Action for U.S. Appl. No. 16/113,114, dated Sep. 10, 2019, 10 pages.
Final Office Action for U.S. Appl. No. 16/113,114, dated Oct. 1, 2019, 8 pages.
Supplemental Response to Final Office Action for Pilot Program for U.S. Appl. No. 16/113,114, dated Dec. 5, 2019, 15 pages.
RCE and Second Supplemental Response to Advisory Action for U.S. Appl. No. 16/113,114, dated Jan. 2, 2020, 12 pages.
Notification of Transmittal to the International Search Report and Written Opinion of the ISA, International Search Report and Written Opinion dated Dec. 21, 2018 for International Application No. PCT/US2018/048153, 10 pages.
Notification of Transmittal to the International Search Report and Written Opinion of the ISA, International Search Report and Written Opinion dated Oct. 18, 2018 for International Application No. PCT/US2018/048082, 10 pages.
Notification Concerning Transmittal of the International Preliminary Report on Patentability (Chapter I of the Patent Cooperation Treaty) dated Mar. 5, 2020 for International Application No. PCT/US2018/048153, 7 pages.
Notification Concerning Transmittal of the International Preliminary Report on Patentability (Chapter I of the Patent Cooperation Treaty) dated Mar. 5, 2020 for International Application No. PCT/US2018/048082, 2 pages.
Non Final Office Action for U.S. Appl. No. 16/113,586, dated Jun. 11, 2020, 17 pages.
European Search Report, dated Jul. 1, 2020 for International Application No. 18848687.2, 8 pages.
Response to Search Opinion filed on Nov. 18, 2020 for European Application No. 18848687.2; 18 pages.

* cited by examiner

BOX AND METHOD OF CONSTRUCTING THE SAME

CROSS REFERENCE TO RELATED APPLICATIONS

The Application is a Continuation Application of U.S. patent application Ser. No. 16,113,114, filed on Aug. 27, 2018, entitled: BOX AND METHOD OF CONSTRUCTING THE SAME, which claims priority to U.S. Provisional Patent Application No. 62/550,122 filed on Aug. 25, 2017 and U.S. Provisional Patent Application No. 62/550,301, filed on Aug. 25, 2017, the contents of which are herein incorporated by reference in their entirety.

FIELD OF THE INVENTION

The present invention relates generally to the packaging and shipment of consumer products and, more particularly, to boxes used in the packaging and shipment of consumer products.

BACKGROUND OF THE INVENTION

The proliferation of e-commerce has created a commensurate increase in need for packaging solutions that are appropriate in the shipment of consumer products. Nonetheless, despite the growing demand for effective shipment packaging, online purchase fulfillment remains most commonly processed using single-use, fixed-size boxes.

E-commerce shipment boxes are most commonly constructed from a preformed, unitary blank that is constructed of a rigid, durable and inexpensive material, such as cardboard or plastic. The blank is shaped to define a plurality of panels that are typically separated by areas of weakness, such as fold lines. Accordingly, as part of the assembly process, the blank is folded about the fold lines to erect the box, with the shape secured through the use of interlocking panels and/or an adhesive.

Although well-known and widely used in the art, boxes formed from a preformed blank, as described above, suffer from a notable drawback. Notably, boxes formed from a preformed blank are fixed in size and thereby incapable of dimensional variability. However, due to the near limitless variety of different products currently available online, packaging requirements can vary considerably depending upon the size and shape of the items ultimately shipped to the purchaser.

As a result, online businesses and e-commerce fulfillment centers often maintain a comprehensive inventory of differently dimensioned boxes. Yet, it has been found that online purchase fulfillment remains largely incapable of packaging and shipping products within an appropriately-sized box. Rather, current studies have indicated online purchases are most commonly packaged in an inefficient fashion, with the average e-commerce package containing approximately 40% of empty, or void, space.

The aforementioned inefficiency in the packaging of products ordered online has been found to create a number of notable shortcomings.

As a first shortcoming, the use of a container that is considerably larger than the products packaged therein results in a corresponding increase in packaging costs. In particular, a greater amount of material is required to form the box itself, with the amount of excess packaging material often exceeding 15% of the amount of corresponding material required to construct an ideally-sized package. Additionally, a substantial about of package filler is typically needed to fill in the empty space within a conventional e-commerce box to prevent product movement and potential damage during shipment, with the amount of excess package filler often exceeding 60% of the amount of corresponding package filler needed in an ideally-sized package.

As a second shortcoming, the use of a container that is considerably larger than the products packaged therein results in a corresponding increase in transportation costs. Notably, storage and delivery costs are typically directly proportional to the size and/or weight of a shipped item. Therefore, an unnecessarily oversized package creates transportation inefficiencies (i.e. increased weight and smaller payloads) for couriers that are, in turn, often financially borne by the consumer. In fact, it has been found that the transportation cost associated with traditional, inefficiently-sized, e-commerce packages often exceeds 20% of the corresponding transportation cost for an ideally-sized package.

SUMMARY OF THE INVENTION

It is an object of the invention to provide a new and improved box for use in the packaging and shipment of consumer products.

It is another object of the present invention to provide a box as described above that can be modified dimensionally to receive consumer products with limited wasted space.

It is yet another object of the present invention to provide a box as described above that has a limited number of parts, is inexpensive to manufacture and is easy to use.

Accordingly, as a feature of the invention, there is provided a box, comprising (a) a continuous strip wound in a helical configuration so as to define a main body with a plurality of bands, (b) wherein adjacent bands are coupled together to render the main body unitary in construction.

As another feature of the invention, there is provided a method of constructing a box, the method comprising the steps of (a) winding a continuous strip in a helical configuration so as to define a main body with a plurality of bands, and (b) coupling together adjacent bands to secure the shape of the main body.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings, wherein like reference numerals represent like parts.

DETAILED DESCRIPTION OF THE INVENTION

Box 11

Figure 1A:
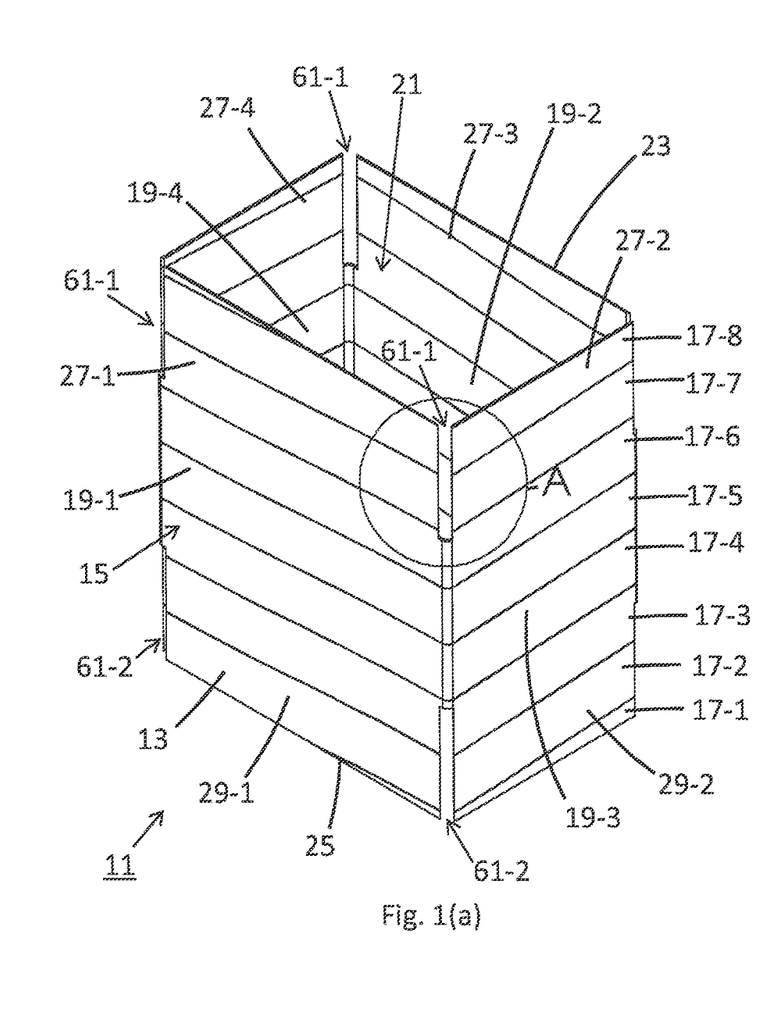
FIG. 1(a) is a top perspective view of a first embodiment of a box constructed according to the teachings of the present invention, the box being shown with its top and bottom flaps positioned open.

Referring now to FIG. 1(a), there is shown a first embodiment of a box constructed according to the teachings of the present invention, the box being defined generally by reference numeral 11. As will be explained in detail below, box 11 is uniquely designed to allow for dimensional variability during its construction and thereby receive a wide variety of different consumer products with limited wasted space, which is a principal object of the present invention. In this manner, the size and shape of box 11 can essentially be customized for the particular consumer products to be retained therein.

As defined herein, the term "box" denotes any enclosable packaging that is appropriately configured to store and transport one or more consumer products without any restriction to shape, size or material. For instance, use of the term "box" herein is not restricted to a container in the shape of a polyhedron (i.e. formed with multiple planar faces), but rather encompasses all conceivable packaging configurations, such as tubular packaging boxes and envelope-type shipping containers.

Box 11 comprises an elongated, continuous strip 13 that is constructed of a rigid and durable material suitable for use in packaging applications, such as a heavy-duty, paper-based, packaging material (e.g. cardboard) or plastic. Notably, strip 13 may be formed using a corrugated cardboard material to provide box 11 with an adequate degree of structural integrity and strength, as will be explained further in detail below.

Strip 13 is wound counterclockwise in a helical configuration to form a unitary box, or main body 15, with a plurality of individual bands, or turns, 17. In the present embodiment, box body 15 is represented as comprising eight separate bands 17-1 thru 17-8. However, as will be explained in detail below, the number of turns 17 is selected based upon the desired height of box 11 (i.e. to fittingly receive the intended product to be packaged) and, as such, is intended to be modified to suit the particular needs of the intended application.

As defined herein, the term "helical" denotes that strip 13 is wrapped about a common central axis, in either a clockwise or counterclockwise direction, to form three-dimensional box body 15. The resultant box body 15 achieved from the helical wrapping of strip 13 can therefore include regions that are flattened and/or curved in any representation.

In the present embodiment, box body 15 is a four-sided member comprising a front panel 19-1, a rear panel 19-2, a first side panel 19-3 and a second side panel 19-4 that together define an interior cavity 21 that can be accessed through an open top end 23 and/or an open bottom end 25. As will be explained further below, box body 15 is slotted and scored so as to define a set of top flaps 27 configured to selectively enclose open top end 23 and a set of bottom flaps 29 configured to selectively enclose open bottom end 25.

Figure 2A:
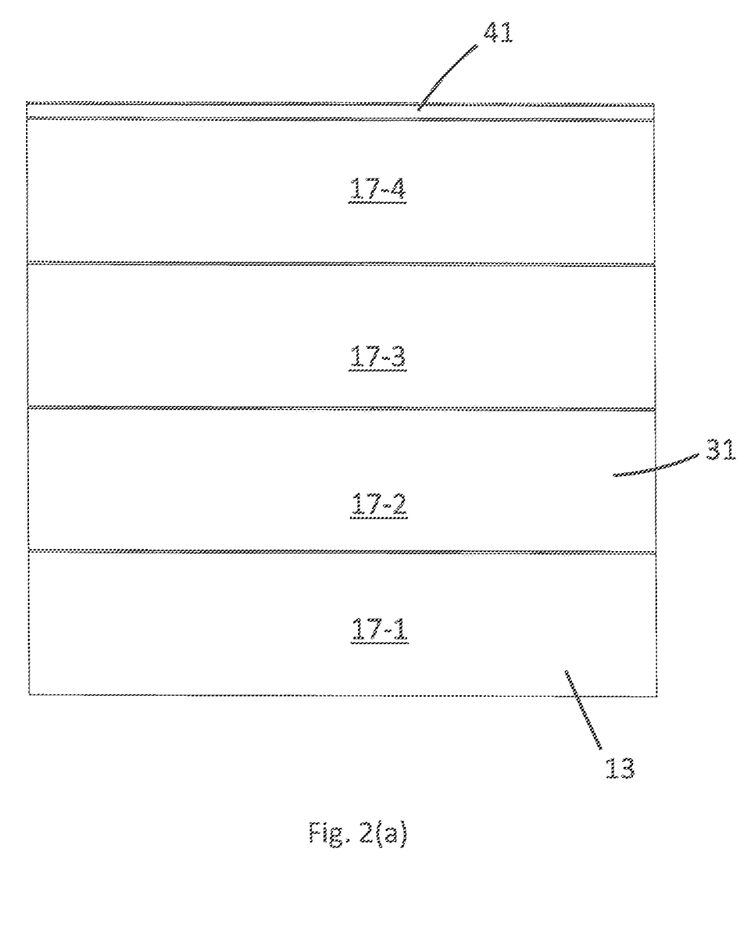
FIGS. 2(a) and 2(b) are front plan and left side views, respectively, of the box shown in FIG. 1(a) at an intermediary stage of its construction, the box being shown with a limited selection of its partially overlapping bands for ease of illustration.
Figures 2B, 3:
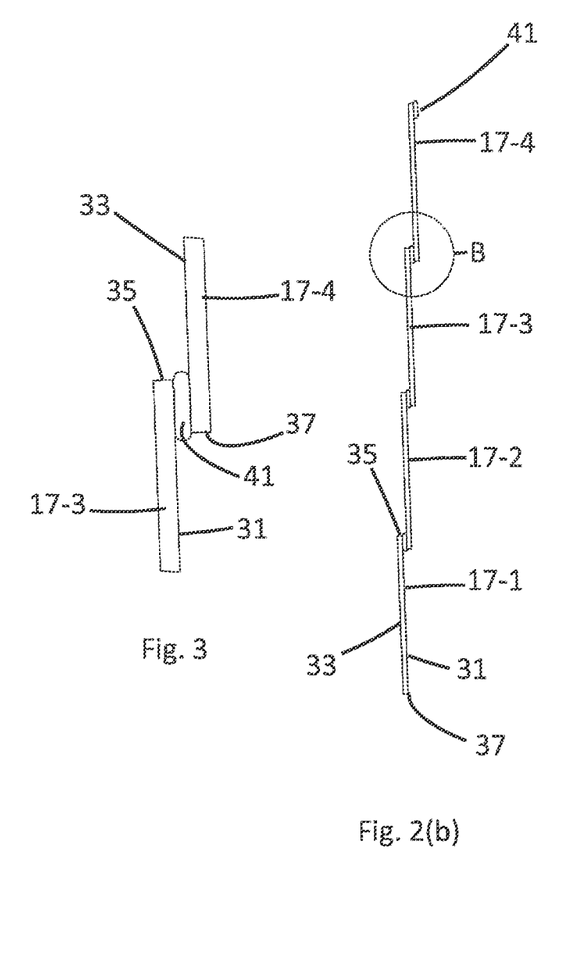
FIG. 3 is an enlarged, fragmentary, left end view of the box shown in FIG. 2(b), taken within circled region B to more closely illustrate the helical arrangement between adjacent bands of the box body.

Referring now to FIGS. 2(a) and 2(b), strip 13 comprises a flattened front surface 31, a flattened rear surface 33, a narrow top edge 35 and a narrow bottom edge 37. As shown herein, strip 13 is preferably of uniform thickness along the majority of its length. However, as will be explained further below, the leading and trail ends of strip 13 are preferably cut, or otherwise tapered, to render both (i) the distal edge of all top flaps 27 generally coplanar, and (ii) the distal edge of all bottom flaps 29 generally coplanar.

As seen most clearly in FIG. 3, each successive, or adjacent, band 17 partially overlies its predecessor. For instance, as shown herein, band 17-4 partially overlies band 17-3, with rear surface 33 of band 17-4 along its bottom edge 37 in contact with front surface 31 of band 17-3 along its top edge 35. In this manner, further helical winding of strap 13 can be performed, as needed, to construct box 11 at the desired height.

It should be noted that both the width of strip 13 as well as the degree of overlap between successive bands 17 can be modified, as needed, to attain the panel strength and visual appearance required for the designated application.

As shown, an adhesive 41 is preferably disposed within the region of contact between adjacent bands 17 of box body 15. In this manner, the adhesive bond established between adjacent bands 17 fixedly secures box body 15 in the desired shape.

In the present embodiment, adhesive 41 is preferably in the form of a quick-dry adhesive that is applied as a thin continuous strip onto front surface 31 along top edge 35 during the strip dispensing process, as seen most clearly in FIGS. 2(a) and 2(b). However, it is to be understood that adhesive 41 represents any type bonding substance that can be used to facilitate construction of box 11. For instance, adhesive 41 may alternatively be in the form of a pressure-sensitive adhesive that is coated onto front surface 31 of strip 13 along top edge 35 at the time of its manufacture. In this scenario, adhesive 41 would only activate when adjacent bands 17 are drawn into contact with one another under sufficient pressure (e.g. during the helical winding process). As another example, adhesive 41 may be in the form of a water-activated adhesive.

Method of Constructing Box 11

Due to its unique method of construction, box 11 can be customized in configuration to receive a wide variety of different consumer products with limited wasted space. The preferred sequence of steps in the process of constructing box 11 is set forth in detail below.

Specifically, as the first step in the process of constructing box 11, a supply of material strip 13 is provided. As referenced above, strip 13 is preferably constructed out of any heavy-duty material that is suitable for use in the packaging of consumer products. To facilitate dispensing and minimize storage requirements, material strip 13 is preferably supplied in the form of a relatively compact reel (not shown).

Figure 4:
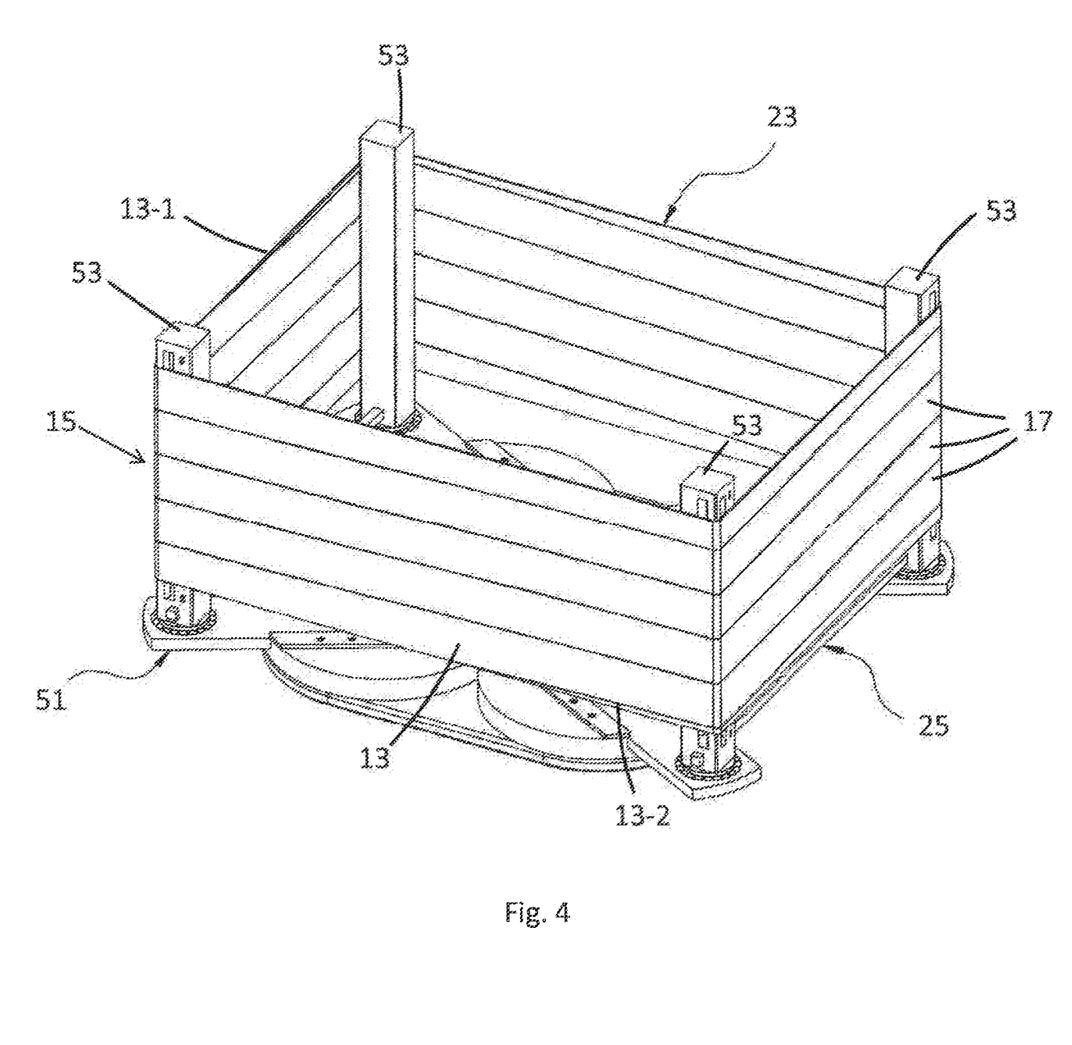
FIG. 4 is top perspective view an adjustable size-mandrel that is designed to facilitate construction of the box shown in FIG. 1.

Next, a mandrel, or form, is utilized to define the basic geometric configuration of the box to be constructed. Referring now to FIG. 4, a size-adjustable mandrel 51 is shown that includes a plurality of vertical posts, or towers, 53 that define the general footprint of the desired box 11 (i.e. towers 53 define the location of the inner corners of box 11). Preferably, each post 53 is capable of being individually displaced relative to the remaining posts 53 in multiple directions to create a virtually boundless variety of potential box configurations.

However, it should be noted that the box construction process of the present invention is not limited to size-adjustable mandrel 51. Rather, the box construction process of the present invention could be implemented using any type of mandrel, whether fixed in size or reconfigurable, without departing from the spirit of the present invention. Accordingly, it is to be understood, that size-adjustable mandrel 51 is provided herein for illustrative purposes only and any reference herein is strictly to assist in the understanding of the novel box construction process.

To commence the box forming process, strip 13 is wound around mandrel 51 in a helical configuration, as shown in FIG. 4, to create box body 15 with bands 17. As referenced previously, quick-dry adhesive 41 is preferably applied to front surface 31 of strip 13 along top edge 35 immediately prior to the helical winding process (e.g. after initial dispensing from a reel) to secure the shape of main body 15.

In the present embodiment, successive bands 17 are disposed to overlie one another through a region of contact, with successive bands 17 being bonded together by adhesive 41 disposed therebetween. However, as will be explained further in detail below, adjacent bands 17 could be alternatively arranged (i.e. in a non-overlapping fashion) without departing from the spirit of the present invention. Additionally, it should be briefly noted that alternative and/or supplemental means for securing adjacent bands 17 could be implemented to fix the shape of box body 15, as will be explained further in detail below.

Figure 5:
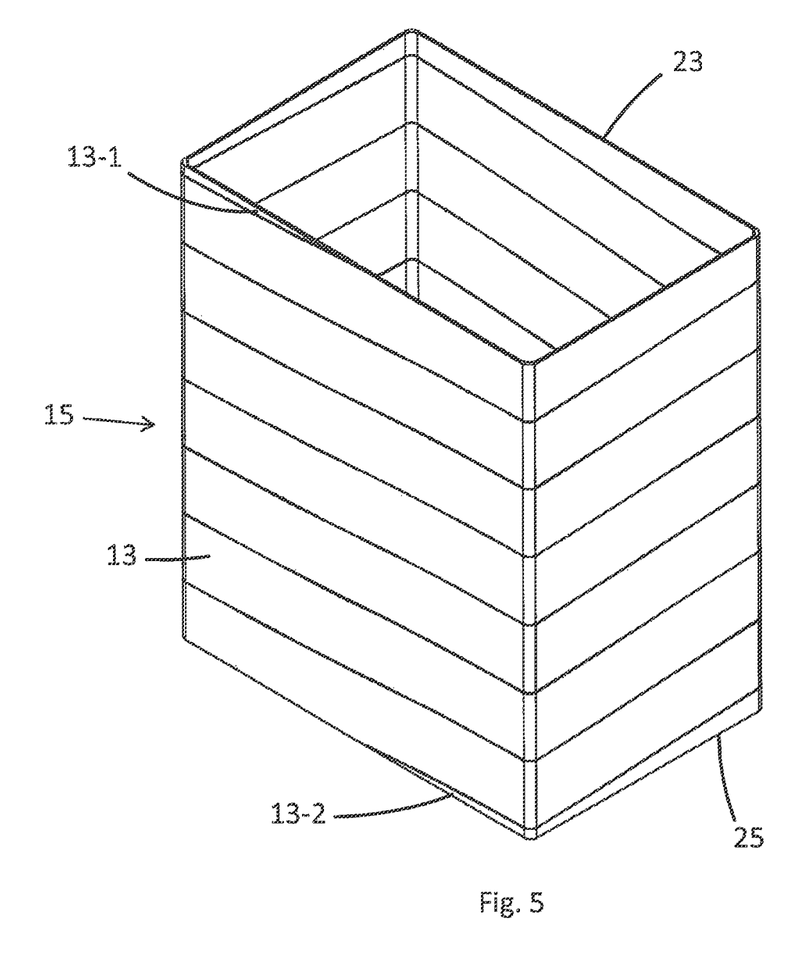
FIG. 5 is a top perspective view of the box shown in FIG. 1 at an intermediary stage of its construction.

Once box body 15 is of a height suitable for the consumer products to be packaged therein (while compensating for the width of top and bottom flaps 27 and 29 to be subsequently formed therefrom), strip 13 is cut from the remainder of its supply reel. Thereafter, leading end 13-1 and trail end 13-2 are preferably trimmed (i.e. tapered in width) to form a narrow wedge-like tip, as seen most dearly in FIG. 5. In this manner, each of open top end 23 and open bottom end 25 of box body 15 is rendered generally coplanar, the benefit of which will become apparent below.

With box body 15 formed in the manner set forth above, vertical slots are formed in box body 15 to create flaps for selectively enclosing open top end 23 and open bottom end 25. Specifically, referring back to FIGS. 1(a) and 1(b), a first set of vertical slots 61-1 is formed in open top end 23 of box body 15 at the juncture, or corner, of adjacent panels 19. Similarly, a second set of vertical slots 61-2 is formed in open bottom end 23 of box body 15 at the juncture, or corner, of adjacent panels 19.

In this manner, box 11 is constructed to include front panel 19-1, rear panel 19-2, first side panel 19-3 and second side panel 19-4 which together define an interior cavity 21 that is accessible through either open top end 23 or open bottom end 25. Additionally, box 11 includes set of pivotable top flaps 27-1 thru 27-4 which are dimensioned to selectively enclose open top end 23 and set of pivotable bottom flaps 29-1 thru 29-4 which are dimensioned to selectively enclose bottom end 25, the entire set of flaps 27 and 29 being illustrated in FIGS. 6(a) and 6(b).

Figure 1B:
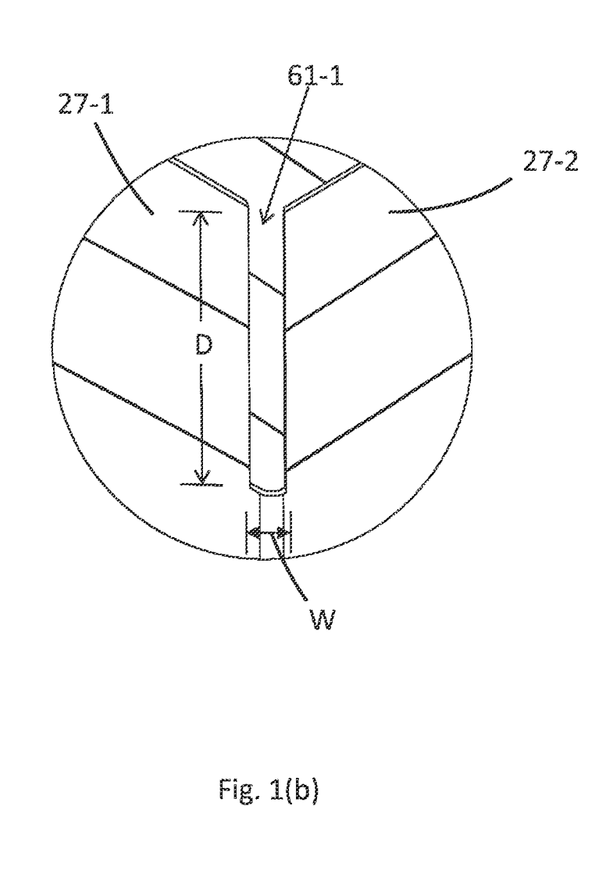
FIG. 1(b) is an enlarged, fragmentary, perspective view of the box shown in FIG. 1(a), taken within circled region A to more closely illustrate one of the vertical slots in the box body.

As seen most dearly in FIG. 1(b), each slot 61 is of a fixed depth D that is suitable for creating appropriately dimensioned flaps 27 and 29. Also, each slot 61 is preferably of a width W that prevents interference between adjacent top and bottom flaps 27 and 29, while, at the same time, ensures adequate enclosure of open top and bottom ends 23 and 25 when pivoted closed.

Figure 6A:
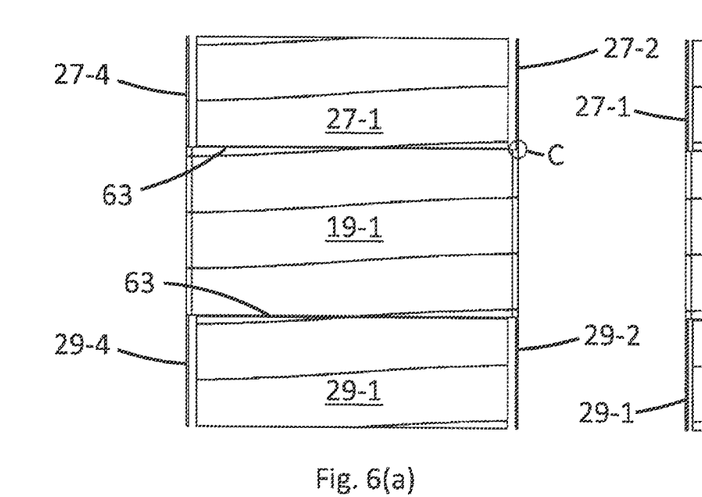
FIGS. 6(a) and 6(b) are front plan and right-side views, respectively, of the box shown in FIG. 1, the box being shown with score lines to more closely illustrate the pivotability of top and bottom flaps.
Figure 6B:
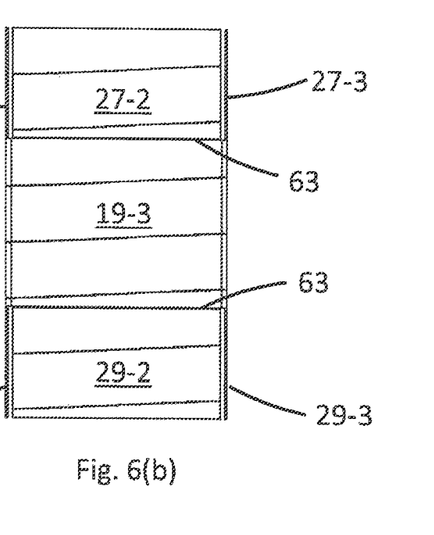
Figure 7:
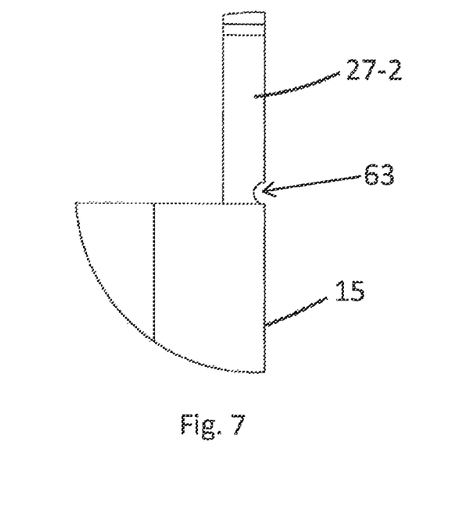
FIG. 7 is an enlarged, fragmentary, front plan view of the box shown in FIG. 6(a), taken within circled region C to more closely illustrate the details of one of the score lines.

Referring now to FIGS. 6(a), 6(b) and 7, a horizontal notch 63, generally C-shaped in lateral cross-section, is formed in the exterior of box body 15 as a line separating, or defining, the proximal edge of each of flaps 27 and 29 from its adjacent panel 19 (i.e. linearly between the terminal ends of adjacent upper and lower slots 61). As such, each linear notch, or score line, 63 creates a region of weakness which facilitates folding of flaps 27 and 29.

In the present embodiment, box 11 is represented as a regular slotted container, or RSC, wherein (i) top flaps 27-1 thru 27-4 are of the same size and shape as bottom flaps 29-1 thru 29-4, respectively, and (ii) each pair of outer lengthwise flaps (i.e. top flap pair 27-1 and 27-3 as well as bottom flap pair 29-1 and 29-3) are one-half of the width of box 11 and thereby align in abutment at the center of its corresponding box opening. However, it is to be understood that box 11 is not limited to any particular flap style. Rather, box body 15 could be cut and scored to define alternative flap styles without departing from the spirit of the present invention.

Upon completion of the aforementioned slotting and scoring processes, the outer dimensions, or footprint, of mandrel 51 is temporarily contracted to the extent necessary that box 11 can be easily removed therefrom. Thereafter, to package the desired products within box 11, bottom flaps 29 are first pivoted closed and are, in turn, secured together using a suitable adhesive, such as tape. The desired product is then deposited within interior cavity 21 through open top end 23. Due to the customized sizing of box 11, interior cavity 21 is dimensioned to fittingly receive the product with minimal excess space. Afterwards, top flaps 27 are pivoted closed and secured together with a suitable adhesive material, thereby completing the customized packaging of the designated product.

Alternate Embodiments and Design Modifications

The invention described in detail above is intended to be merely exemplary and those skilled in the art shall be able to make numerous variations and modifications to it without departing from the spirit of the present invention. All such variations and modifications are intended to be within the scope of the present invention as defined in the appended claims.

For instance, it should be noted that box 11 is not limited to the use of an adhesive 41 disposed between overlapped regions of adjacent bands 17 to secure the shape of box body 15. Rather, supplemental or replacement means for securing the shape of box body 15 could be implemented without departing from the spirit of the present invention.

Figure 8A:
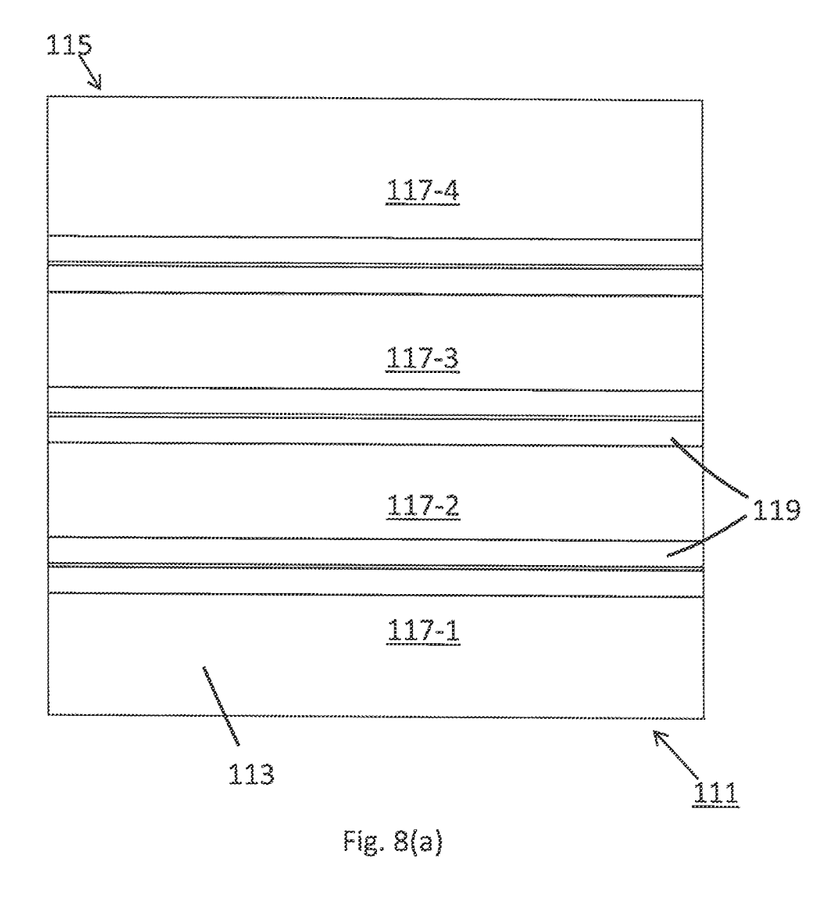
FIGS. 8(a) and 8(b) are front plan and left side views, respectively, of a second embodiment of a box constructed according to the teachings of the present invention, the box being shown at an intermediary stage of its construction for ease of illustration.
Figure 8B:
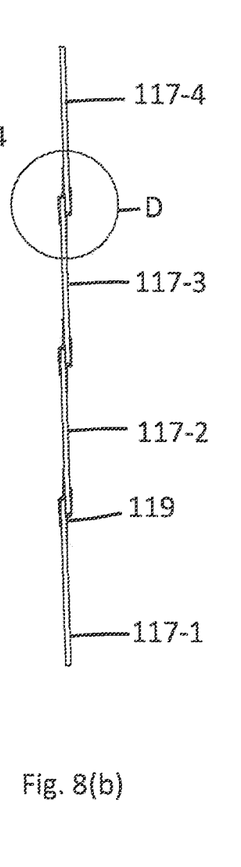
Figure 9:
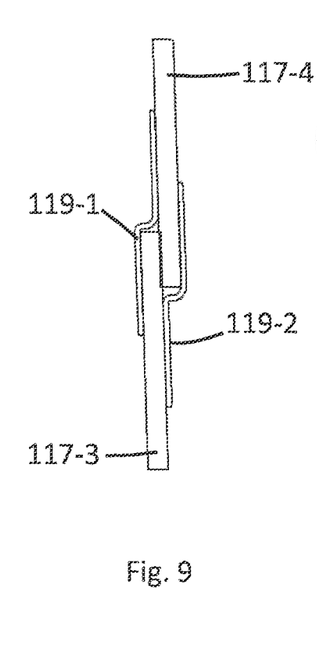
FIG. 9 is an enlarged, fragmentary, left end view of the box shown in FIG. 8(b), taken within circled region D to more closely illustrate the alternative means for securing adjacent bands of the box body.

Notably, referring now to FIGS. 8(a) 8(b), and 9, there is shown a second embodiment of a box constructed according to the teachings of the present invention, the box being identified generally by reference numeral 111. As can be seen, box 111 is similar to box 11 in that box 111 comprises a material strip 113 that is wound in a helical configuration to form a box body 115 with partially overlapping bands 117-1 thru 117-4. However, box 111 differs from box 11 in that, in place of adhesive 41, the shape of box body 115 is secured using externally applied lengths of tape 119. For instance, as seen most clearly in FIG. 9, first and second lengths of tape 119-1 and 119-2 are applied to the interior and exterior panel surfaces, respectively, of box body 115 over adjacent bands 117-3 and 117-4. As can be appreciated, tape 119 not only helps secure the shape of box body 115 but also provides the added benefit of smoothing out the interior and exterior panel surfaces of box body 115 (i.e. creating a smoothened surface across the overlapped region of successive bands 117).

Furthermore, in lieu of an adhesive, alternative means for securing together adjacent bands 117 of box body 115 could be achieved without departing from the spirit of the present invention. For example, if strip 113 is formed using a plastic material, localized ultrasonic welding may be applied within the region of contact between adjacent bands 117 to create a permanent bond therebetween.

Additionally, it should be noted that box 11 need not be constructed with successive bands 17 arranged in a partially overlapping configuration. Rather, the interface between adjacent bands 17 of box body 15 could be modified without departing from the spirit of the present invention.

Figure 10A:
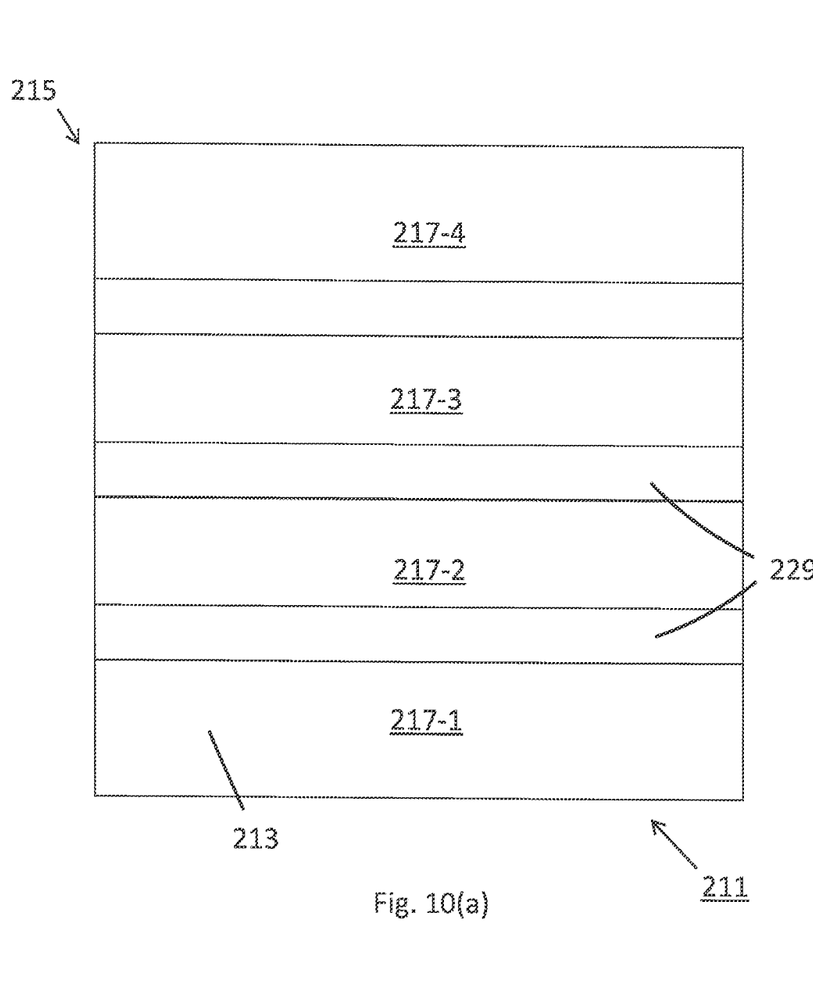
FIGS. 10(a) and 10(b) are front plan and left side views, respectively, of a third embodiment of a box constructed according to the teachings of the present invention, the box being shown at an intermediary stage of its construction for ease of illustration.
Figure 10B:
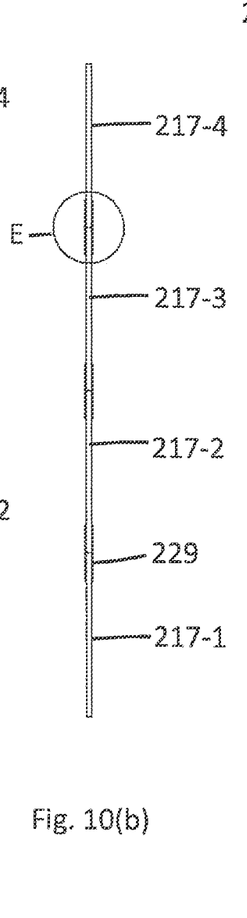
Figure 11:
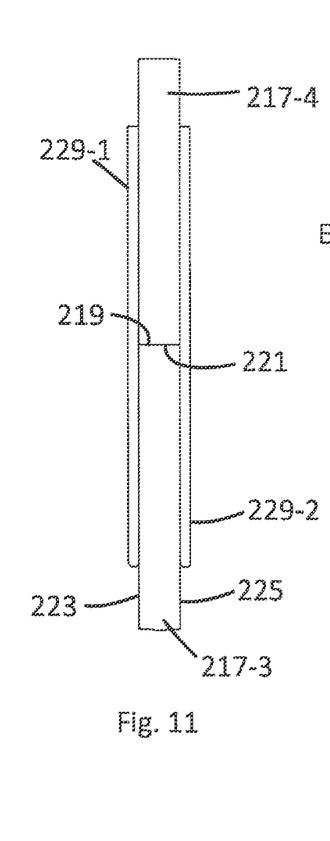
FIG. 11 is an enlarged, fragmentary, left end view of the box shown in FIG. 10(b), taken within circled region E to more closely illustrate an alternative interface between adjacent bands of the box body.

For example, referring now to FIGS. 10(a), 10(b) and 11, there is shown a third embodiment of a box constructed according to the teachings of the present invention, the box being identified generally by reference numeral 211. As can be seen, box 211 is similar to box 111 in that box 211 comprises a material strip 213 that is wound in a helical configuration to form a box body 215 with a plurality of bands 217-1 thru 217-4. However, box 211 differs from box 111 in the nature of the interface, or contact region, between adjacent bands 217.

Specifically, in lieu of a partially overlapping interface between adjacent bands, box body 215 is formed by disposing each successive band 217 in direct vertical alignment with its predecessor to create a substantially planar, panel wall surface, as shown in FIG. 10(b). In other words, as seen most clearly in FIG. 11, bottom edge 219 of band 217-4 is disposed in direct contact against top edge 221 of previous band 217-3 such that interior surface 223 and exterior surface 225 of all bands 217 within a panel of box body 215 lie generally flush with one another (i.e. in coplanar alignment). Arranged as such, first and second bands of tape 229-1 and 229-2 are preferably applied to the interior surface 223 and exterior surface 225, respectively, of box body 215 across adjacent bands 217 to secure the shape of box body 215.

Figure 12A:
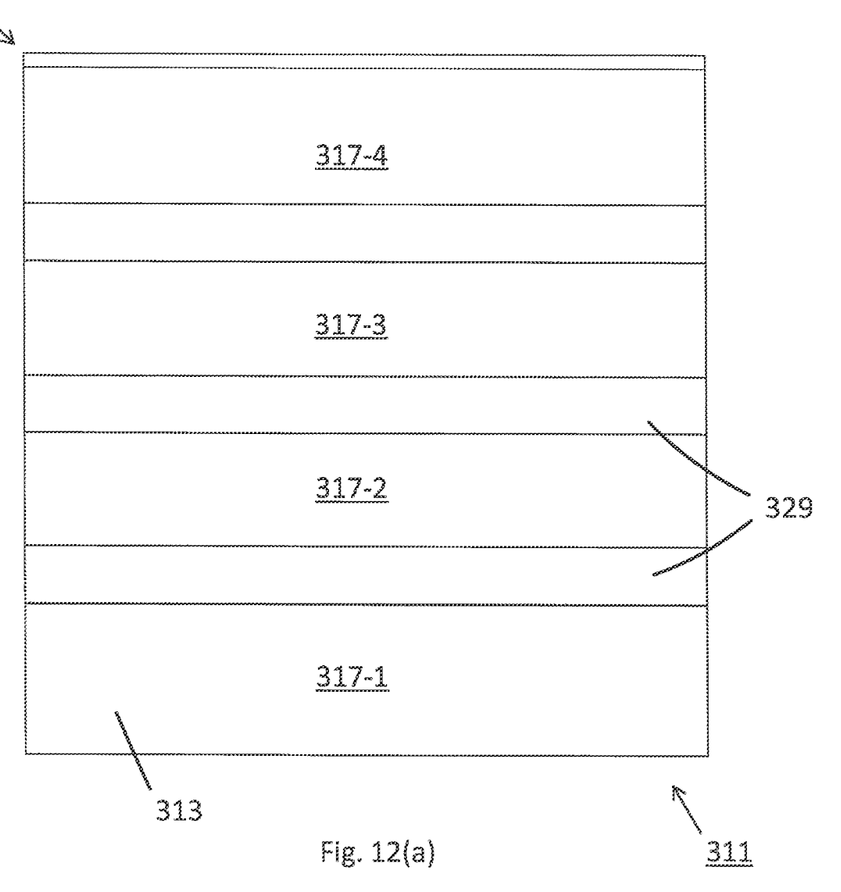
FIGS. 12(a) and 12(b) are front plan and left side views, respectively, of a fourth embodiment of a box constructed according to the teachings of the present invention, the box being shown at an intermediary stage of its construction for ease of illustration.
Figures 12B, 13:
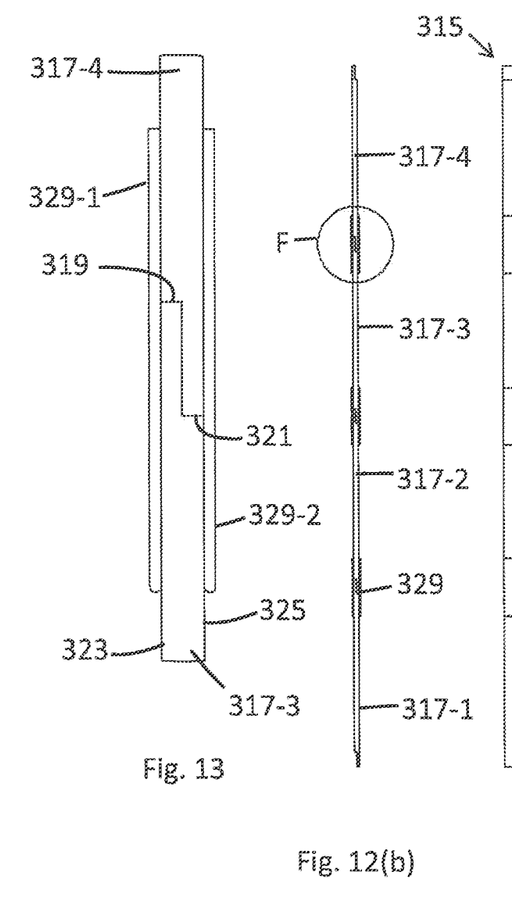
FIG. 13 is an enlarged, fragmentary, left end view of the box shown in FIG. 12(b), taken within circled region F to more closely illustrate an alternative, interlocking-type interface between adjacent bands of the box body.

It should be noted that material strip 213 may be modified to ensure proper alignment between adjacent bands 217 which are vertically aligned in the manner set forth in FIGS. 10(a), 10(b) and 11. Notably, referring now to FIGS. 12(a), 12(b) and 13, there is shown a fourth embodiment of a box constructed according to the teachings of the present invention, the box being identified generally by reference numeral 311. As can be seen, box 311 is similar to box 211 in that box 311 comprises a material strip 313 that is wound in a helical configuration to form a box body 315 with a plurality of bands 317-1 thru 317-4, whereby each successive band 317 is positioned in direct vertical alignment with its predecessor to create a substantially planar wall surface, as shown in FIG. 12(b). However, box 311 differs from box 211 in that material strip 313 is modified to create a unique mating, or interlocking, relationship within the region of contact between successive bands 317.

Specifically, as seen most clearly in FIG. 13, material strip 313 includes a bottom edge 319 and a top edge 321 with complementary stepped surfaces. Accordingly, during formation of box 311, bottom edge 319 of each band 317 matingly engages top edge 321 of its predecessor. Once arranged as such, first and second bands of tape 329-1 and 329-2 are preferably applied to the interior surface 323 and exterior surface 325, respectively, of box body 315 across adjacent bands 317 to secure the shape of box body 315.

As can be appreciated, the unique, interlocking mating relationship between top edge 321 of a first band 317 (e.g. band 317-3) and bottom edge 319 of the next successive band (e.g. band 317-4) ensures proper alignment between adjacent bands 317, thereby resulting in a flush, or coplanar, interior panel surface 323 as well as a flush, or coplanar, exterior panel surface 325. Additionally, the interlocking relationship between top edge 321 of a first band 317 and bottom edge 319 of the next successive band serves to increase the connective strength between adjacent bands 317 as compared to previous embodiments.

It should be noted that a corrugated version of material strip 313 could be implemented to provide box body 313 with adequate strength and rigidity for conventional shipping applications. For instance, referring now to FIGS. 14(a)-(c), there is shown a corrugated material strip 413 that is particularly well-suited for use in forming box body 313.

Figure 14A:
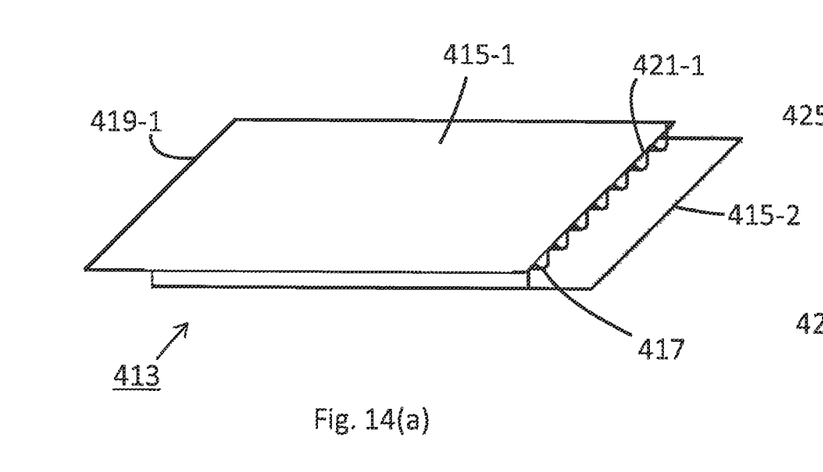
FIGS. 14(a)-(c) are rear perspective, rear plan, and left end views, respectively, of a strip of material constructed according to the teachings of the present invention, the strip of material being particularly well suited for use in constructing a box through a helical winding process.
Figure 14B:
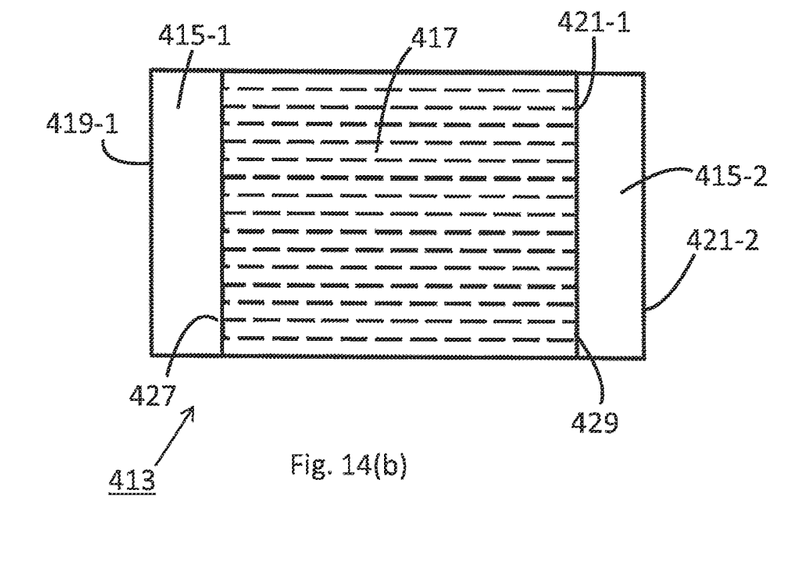
Figure 14C:
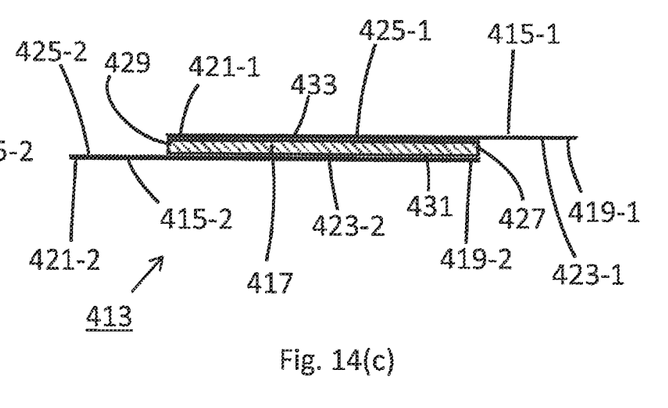

Specifically, material strip 413 comprises first and second linerboards 415-1 and 415-2 between which is disposed a corrugated layer 417. As will be explained further in detail below, each of linerboards 415 extends beyond an opposing edge of corrugated layer 417 to create an extension, or lip, that overlies the seam between adjacent layers of strip 413 when wound in a helical configuration.

Each of linerboards 415 is preferably constructed from a generally planar sheet of paper-based material. As such, first linerboard 415-1 comprises a top edge 419-1, a bottom edge 421-1, a front surface 423-1 and a rear surface 425-1. Similarly, second linerboard 415-2 comprises a top edge 419-2, a bottom edge 421-2, a front surface 423-2 and a rear surface 425-2.

Corrugated layer 417 is constructed from a sheet of fluted material that affords strip 413 with the necessary rigidity and durability for routine packaging applications. Corrugated layer 417 comprises a top edge 427, a bottom edge 429, a front surface 431 and a rear surface 433. As seen most clearly in FIG. 14(c), corrugated layer 417 is sandwiched directly between first and second linerboards 415-1 and 415-2 and is permanently secured thereto with a suitable adhesive (not shown) to render material strip 413 a unitary item.

As a feature of the present invention, top edge 419-1 of first linerboard 415-1 extends beyond top edge 427 of corrugated layer 417. Similarly, bottom edge 421-2 of second linerboard 415-2 extends beyond bottom edge 429 of corrugated layer 417. At the same time, bottom edge 421-1 of first linerboard 415-1 lies generally flush with bottom edge 429 of corrugated layer 417 and top edge 419-2 of second linerboard 415-2 lies generally flush with top edge 427 of corrugated layer 417.

Figure 15:
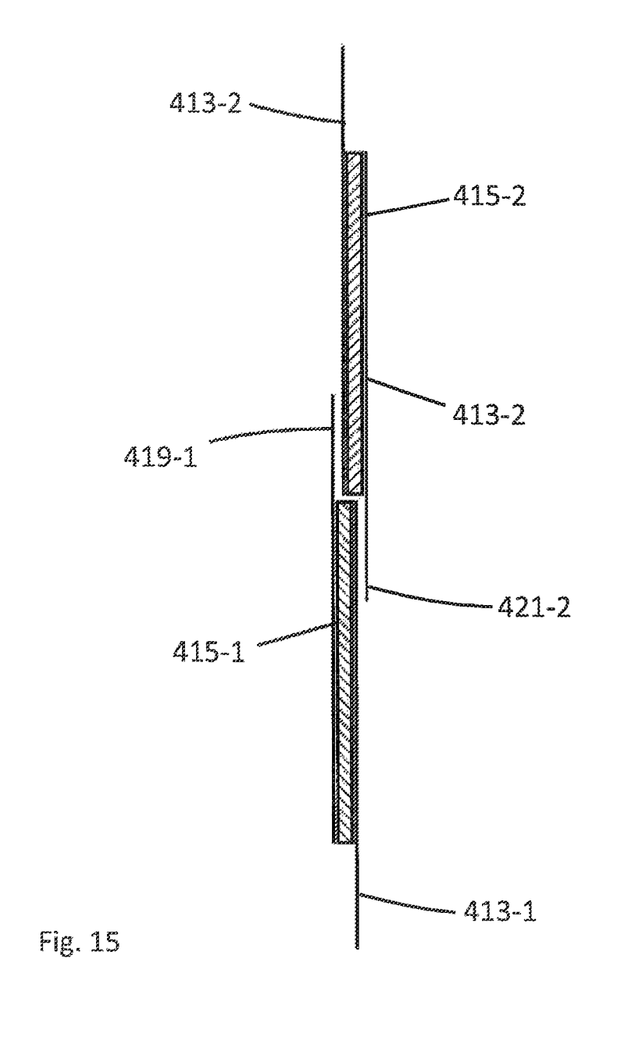
FIG. 15 is a left end, section view of a box panel formed using the strip of material shown in FIG. 14(a), wherein adjacent bands are shows slightly spaced apart for ease of illustration.

As a result, top edge 419-1 of first linerboard 415-1 and bottom edge 421-2 of second linerboard 415-2 form extensions that allow for a near seamless vertical abutment of successive bands when material strip 413 is wound in a helical configuration. In particular, as shown in FIG. 15, with strip 413 helically wrapped as a plurality of vertically aligned bands, top edge 419-1 of linerboard 415-1 for a first band of material 413-1 overlies the seam, or junction, between a second band of material 413-2 disposed in direct vertical alignment therewith. Additionally, bottom edge 421-2 of linerboard 415-2 for second band of material 413-2 overlies the seam with first band of material 413-1 upon the opposing surface. As such, the junction between bands 413-1 and 413-2 is rendered dean and seamless.

It should be noted that strip 413 is not limited to a construction with a single corrugated layer. Rather, it is to be understood that strip 413 could incorporate additional corrugated layers, each disposed directly between an adjacent pair of linerboards, without departing from the spirit of the present invention. However, it should be noted that in each implementation with multiple corrugated walls, the outermost linerboards preferably include opposing, offset extensions to allow for seamless vertical abutment of successive bands when the material strip is wound in a helical configuration.

Lastly, it should be noted that the present invention is not limited to the use of vertical slots 61 to define top and bottom sets of flaps 27 and 29 in box body 15. Rather, alternative means for forming top and bottom flaps 27 and 29 in box body 15 could be implemented without departing from the spirit of the present invention. For instance, a series of creases could be incorporated into box body 15 to create areas of weakness through which box body 15 can be folded to create flaps capable of enclosing open top end 23 and/or an open bottom end 25.

Figure 16A:
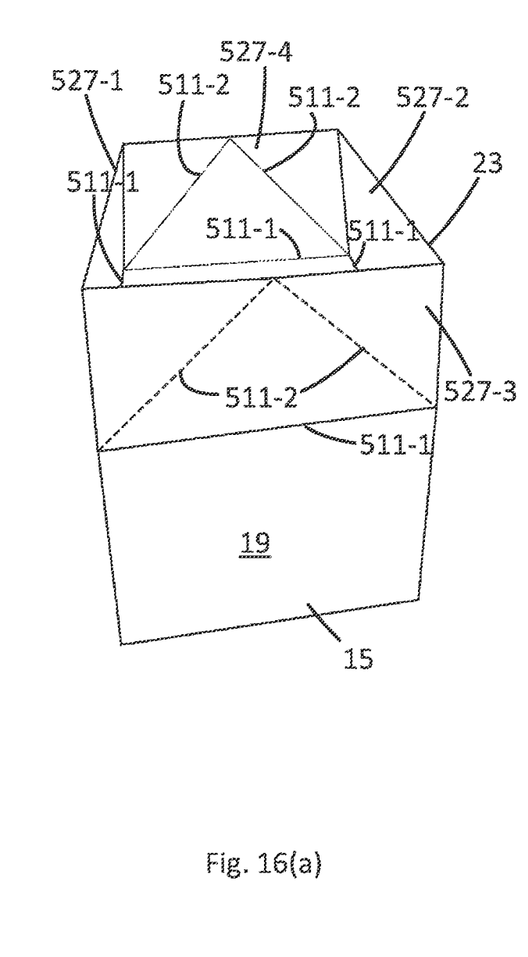
FIGS. 16(a)-(f) are a series of top, right side, perspective views of the box body shown in FIG. 5 at various stages of enclosing its open top using a creasing technique to form a set of top panels.
Figures 16B, 16C:
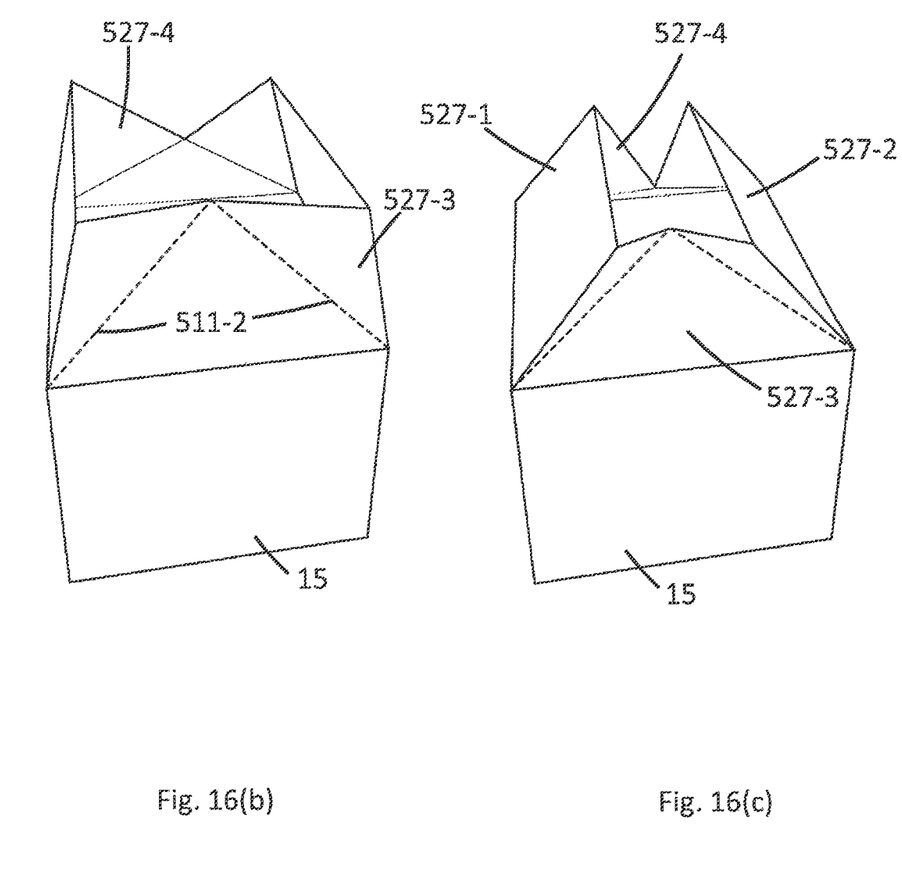
Figure 16D:
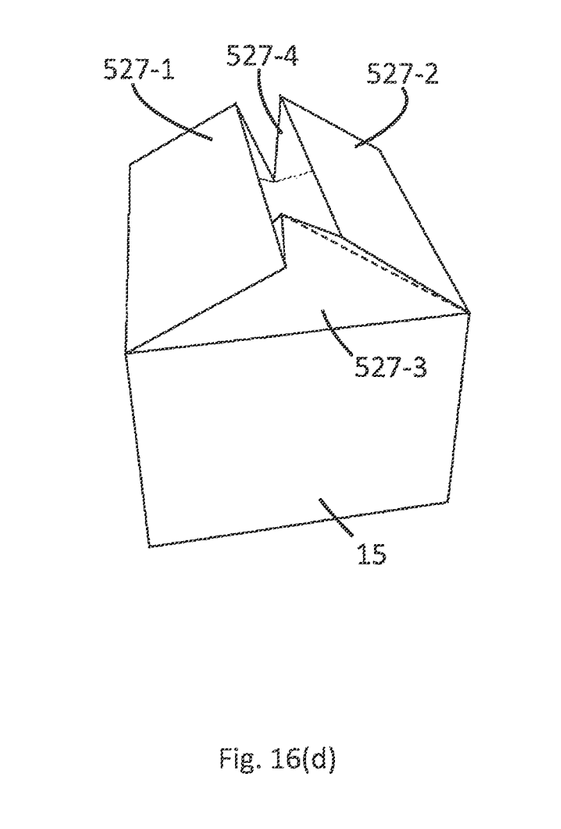
Figure 16E:
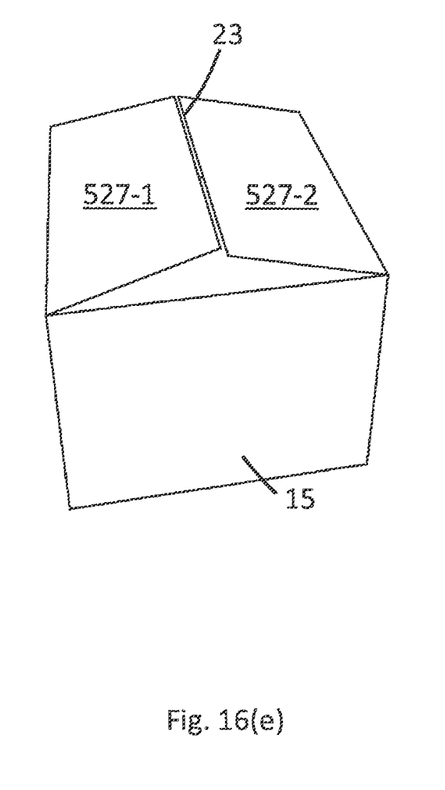
Figure 16F:
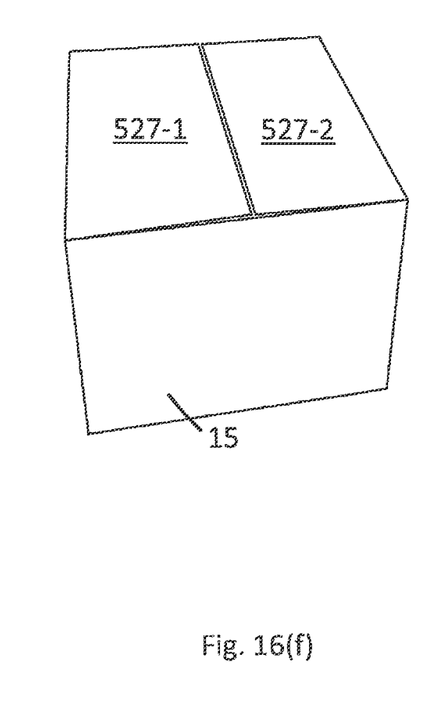

More specifically, as shown in FIG. 16(a), a series of contiguous, horizontal, linear creases 511-1 can be formed in each panel 19 of box body 15 to create a set of top flaps 527-1 thru 527-4 which are designed to selectively enclose open top end 23. Additionally, a pair of diagonal creases 511-2 is formed in opposing side flaps 527-3 and 527-4. As seen most clearly in FIGS. 16(b)-(d), creases 511-2 enable small flaps 527-3 and 527-4 to fold inward, or collapse. In this capacity, long flaps 527-1 and 527-2 are able to pivot inward. As seen most clearly in FIGS. 16(e) and 16(f), long flaps 527-1 and 527-2 are suitably dimensioned to enclose open top end 23 of box body 15.

For ease of illustration only, the creasing technique described in detail above is applied to box body 15 to enclose open top end 23. However, it is to be understood that a similar creasing technique could be applied to box body 15 to enclose open bottom end 25 without departing from the spirit of the present invention.

What is claimed is:

1. A box, comprising:
a continuous strip wound in a helical configuration so as to define a main body and a plurality of flaps, the main body including a plurality of bands, and each of the plurality of flaps including at least a portion of a band;
wherein adjacent bands are coupled together to render the main body unitary in construction, the main body having at least one notch or score formed on an exterior surface of the main body, the at least one notch or score being arranged to create a region of weakness that facilitates a folding of one or more flaps, the at least one notch or score being formed over at least two adjacent bands that are coupled together.

2. The box of claim 1, wherein the continuous strip comprises a layer of corrugated material that is disposed between a first layer of material and a second layer of material.

3. The box of claim 2, wherein the first layer of material is arranged to form a lip that overlies a seam of adjacent ones of the plurality of bands when the continuous strip is wound in the helical configuration so as to define the main body.

4. The box of claim 2, wherein adjacent bands of the main body are in contact with one another and engage with one another through a mating interface.

5. The box of claim 4, wherein adjacent bands of the main body are partially overlapping.

6. The box of claim 4, wherein adjacent bands of the main body are in direct vertical alignment.

7. The box of claim 1, wherein the plurality of flaps are integral with one another, and the plurality of flaps are formed by at least two pairs of creases running across some of the plurality of bands, the creases in each of the pairs being arranged at an angle relative to one another, and the creases in each of the pairs being arranged to meet at a top edge of the plurality of flaps.

* * * * *